(12) United States Patent
Kouno

(10) Patent No.: US 9,450,965 B2
(45) Date of Patent: Sep. 20, 2016

(54) MOBILE DEVICE, PROGRAM, AND CONTROL METHOD

(71) Applicant: NEC CASIO Mobile Communications, Ltd., Kanagawa (JP)

(72) Inventor: Tomoya Kouno, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/409,024

(22) PCT Filed: Jan. 25, 2013

(86) PCT No.: PCT/JP2013/000378
§ 371 (c)(1),
(2) Date: Dec. 18, 2014

(87) PCT Pub. No.: WO2013/190736
PCT Pub. Date: Dec. 27, 2013

(65) Prior Publication Data
US 2015/0326583 A1 Nov. 12, 2015

(30) Foreign Application Priority Data
Jun. 18, 2012 (JP) .................................. 2012-136847

(51) Int. Cl.
*H04L 29/00* (2006.01)
*H04L 29/06* (2006.01)
(Continued)

(52) U.S. Cl.
CPC ......... *H04L 63/108* (2013.01); *G06F 21/6218* (2013.01); *G06F 21/6245* (2013.01);
(Continued)

(58) Field of Classification Search
CPC ................ G06F 2221/2113; G06F 2221/2141

USPC .................. 726/1–4, 16, 17, 21, 26–30; 713/164–167, 189–194

See application file for complete search history.

(56) References Cited

U.S. PATENT DOCUMENTS

| 8,135,385 B2 | 3/2012 | Ohta et al. |
| 2003/0097596 A1* | 5/2003 | Muratov ............... G06F 21/31 726/26 |

(Continued)

FOREIGN PATENT DOCUMENTS

| CN | 100583118 | 1/2010 |
| EP | 1950681 | 7/2008 |

(Continued)

OTHER PUBLICATIONS

International Search Report, PCT/JP2013/000378, Apr. 9, 2013.

(Continued)

*Primary Examiner* — Madhuri Herzog
(74) *Attorney, Agent, or Firm* — Young & Thompson

(57) ABSTRACT

When a pre-determined time period has elapsed after a user access is last detected, a mobile device performs protection processing on account-related information. The mobile device includes an access detection unit that detects that a user accesses the mobile device, and a time period determination unit that determines whether or not a pre-determined time period has elapsed from a last user access time point at which the user last accessed the mobile device. The mobile device further includes a storage location acquisition unit that acquires a location in the data storage unit in which the account-related information is stored, and a protection unit that performs the protection processing on the account-related information based on the storage location of the account-related information acquired by the storage location acquisition unit, when the time period determination unit determines that a pre-determined time period has elapsed from the last user access time point.

19 Claims, 7 Drawing Sheets

(51) Int. Cl.
  *G06F 21/62* (2013.01)
  *H04W 12/00* (2009.01)
  *H04W 12/08* (2009.01)
  *G06F 21/88* (2013.01)

(52) U.S. Cl.
  CPC ............. *G06F21/88* (2013.01); *H04L 63/101* (2013.01); *H04W 12/00* (2013.01); *H04W 12/08* (2013.01); *G06F 2221/2137* (2013.01); *G06F 2221/2141* (2013.01)

(56) References Cited

U.S. PATENT DOCUMENTS

| | | | | |
|---|---|---|---|---|
| 2006/0064762 | A1* | 3/2006 | Kayashima | H04L 9/3297 726/27 |
| 2007/0123241 | A1* | 5/2007 | Arnold | G06F 12/0253 455/418 |
| 2007/0298767 | A1* | 12/2007 | Brown | G06F 21/305 455/411 |
| 2008/0034224 | A1 | 2/2008 | Ferren et al. | |
| 2010/0317324 | A1 | 12/2010 | Brown et al. | |
| 2011/0055593 | A1 | 3/2011 | Lurey et al. | |
| 2011/0055931 | A1 | 3/2011 | Lurey et al. | |
| 2011/0321153 | A1 | 12/2011 | Stoev et al. | |
| 2012/0079586 | A1 | 3/2012 | Brown et al. | |

FOREIGN PATENT DOCUMENTS

| | | |
|---|---|---|
| JP | 2001-160052 | 6/2001 |
| JP | 2002-251304 | 9/2002 |
| JP | 2003-289352 | 10/2003 |
| JP | 2004-341986 | 12/2004 |
| JP | 2007-264897 | 10/2007 |
| JP | 2007-288494 | 11/2007 |
| JP | 2008-123202 | 5/2008 |
| JP | 2008-518364 | 5/2008 |
| JP | 2008-154080 | 7/2008 |
| JP | 2008-181467 | 8/2008 |
| JP | 2011-198094 | 10/2011 |
| WO | WO 2011/025844 | 3/2011 |

OTHER PUBLICATIONS

Supplementary European Search Report dated Nov. 20, 2015 in corresponding European Patent Application No. 13806571.9.
Chinese Official Action—201380032178.8—Jul. 5, 2016.

* cited by examiner

| USER ID | LAST ACCESS TIME |
|---------|------------------|
| alice   | 2012/10/10 21:50;30 |
| bob     | 2012/10/8 10:30;05 |
| foo     | 2012/9/30 8:25;25 |
| ⋮       | ⋮ |

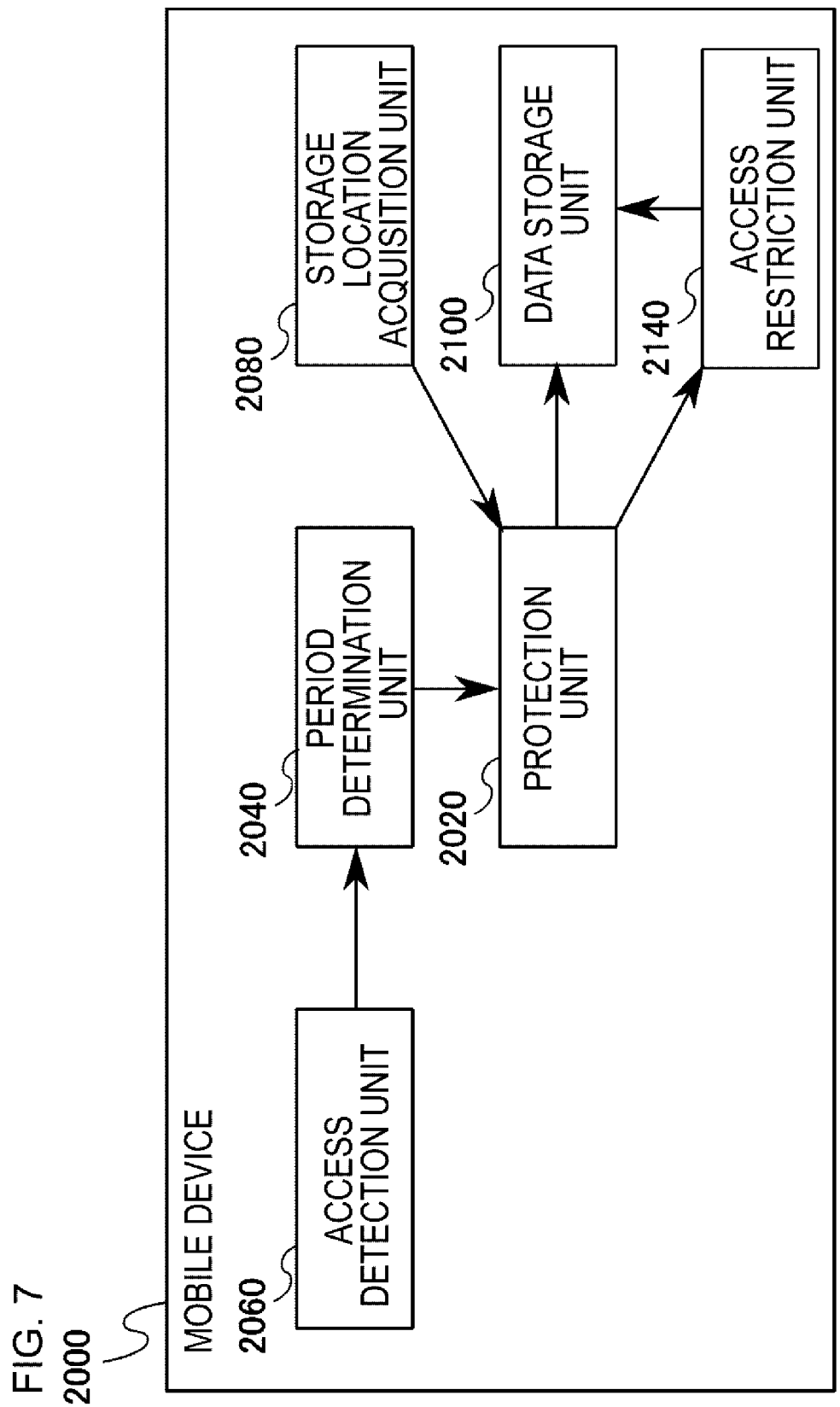

MOBILE DEVICE, PROGRAM, AND CONTROL METHOD

TECHNICAL FIELD

The present invention relates to a mobile device, a program, and a control method.

BACKGROUND ART

In recent years, many mobile devices are found using cloud computing, and an account on a network is required for using the devices. The account is a right for a user to log into a specific device and the like, and information for specifying an account is referred to as account information. For example, the account information includes a combination of an ID for identifying a user and a password. Various types of information, which is used and generated in the mobile device, are stored on the network, as account-related information associated with the account information. An example of the account-related information includes e-mails, schedules, contact information, configuration files, music, videos, and the like. By storing the account-related information on a network with being associated with the account information, the same environment can be restored when the user changes the mobile device. Further, various types of data and environment settings may be shared with another mobile device or a device such as a personal computer (hereinafter, PC). Furthermore, by holding a plurality of accounts and setting an environment for each account, the user may easily change the environment settings of a device by switching the account.

In many mobile devices using accounts, the account information provided by the user and the account-related information acquired from the network are stored in the device. Therefore, if the user loses the device, there is a risk of that a third party views the account information and the account-related information.

Patent Document 1 discloses a technology of monitoring a state of a mobile device and automatically deleting data which is pre-designated by the user when the state meets a pre-designated condition. The user sets three conditions in advance as follows: 1) an upper limit time to allow the continuation of a state with respect to each of various states of the mobile device such as a power-off, 2) operations of the mobile device which trigger the process of data deletion, and 3) data to be deleted. The mobile device disclosed in Patent Document 2 checks whether or not the respective states designated in 1) continue longer than the upper limit time when any operation designated in 2) is performed, and deletes data designated in 3) when any state continues longer than the upper limit time.

Patent Document 2 discloses a technology of monitoring two points including 1) whether a user is present near a device, and 2) whether or not a radio wave condition is out of range, and of protecting data according to the monitored status by processing of locking access to data in the device, saving data to an external device, or deleting data.

As a technology aimed at protecting data in addition thereto, there are Patent Documents 3 to 6. Further, Patent Documents 7 and 8 disclose technologies of managing accounts through the use restriction of an account or automatic deleting in a server which manages accounts. Patent Document 9 discloses a technology of lowering a security level of data in accordance with the passage of time, or the like.

RELATED DOCUMENT

Patent Document

[Patent Document 1] Japanese Unexamined Patent Publication No. 2008-181467
[Patent Document 2] Japanese Unexamined Patent Publication No. 2008-154080
[Patent Document 3] Japanese Unexamined Patent Publication No. 2007-264897
[Patent Document 4] Japanese Unexamined Patent Publication No. 2001-160052
[Patent Document 5] Japanese Unexamined Patent Publication No. 2002-251304
[Patent Document 6] Japanese Unexamined Patent Publication No. 2008-518364
[Patent Document 7] Japanese Unexamined Patent Publication No. 2011-198094
[Patent Document 8] Japanese Unexamined Patent Publication No. 2004-341986
[Patent Document 9] Japanese Unexamined Patent Publication No. 2008-123202

DISCLOSURE OF THE INVENTION

A plurality of pieces of account-related information which are present in a mobile device are individually used by respective applications while not being collectively controlled. Therefore, it is difficult to prevent the leakage of various types of account-related information stored in the mobile device.

As the technology disclosed in the Patent Document 1, there is a technology of automatically protecting data which is selected in advance by the user, but it is difficult to let the user select various types of account-related information among data that the mobile device holds. The reasons being, first, the mobile device has a large amount of data, in many cases; and second, the account-related information includes data which the user does not normally know, such as data used only inside an application or data for storing an environmental setting, in some cases.

Further, although there are some technologies such as those described in the Patent Document 1 for achieving protection of all data contained in the mobile device, and those described in the Patent Document 2 for achieving protection of some pieces of data such as an address book, these technologies may not collectively protect the account-related information.

Accordingly, in methods which are proposed in the respective Patent Documents described above, it is difficult to prevent the leakage of various types of account-related information which are scattered in the mobile device.

An object of the present invention is to provide a mobile device, a program, and a control method, which prevent the leakage of account-related information stored in the mobile device.

A mobile device provided by the present invention is a mobile device in which a plurality of applications are installed, the mobile device including: a storage location acquisition unit for acquiring a storage location of each piece of account-related information, the account-related information is used by each of the applications; an access detection unit for detecting a user access to the mobile device; a time period determination unit for determining whether or not a pre-determined time period has elapsed after the access detection unit detects a last user access; and a protection unit for applying protection processing on each piece of the account-related information based on each storage location acquired by the storage location acquisition unit, when the time period determination unit determines that the pre-determined time period has elapsed.

A program provided by the present invention is a program for controlling a mobile device in which a plurality of applications are installed, the program causing the mobile device to have: a function of acquiring a storage location of each piece of account-related information, the account-related information is used by each of the applications; a function of detecting a user access to the mobile device; a function of determining whether or not a pre-determined time period has elapsed after the function of detecting a user access detects a last user access; and a function of applying protection processing on each piece of the account-related information based on each storage location acquired by the function of acquiring a storage location of each piece of the account-related information, when the function of determining whether or not the pre-determined period has elapsed detects that the pre-determined period has elapsed.

A control method provided by the present invention is a control method of controlling a mobile device in which a plurality of applications are installed, the method including: a step of causing the mobile device to acquire a storage location of each piece of account-related information, the account-related information is used by each of the applications; a step of causing the mobile device to detect a user access to the mobile device; a step of causing the mobile device to determine whether or not a pre-determined time period has elapsed after the step of detecting a user access detects a last user access; and a step of causing the mobile device to apply protection processing on each piece of the account-related information based on each storage location acquired in the step of acquiring a storage location of the account-related information, when the step of determining whether or not the pre-determined time period has elapsed detects that the pre-determined time period has elapsed.

According to the present invention, provided are a mobile device, a program, and a control method, which prevent leakage of account-related information stored in the mobile device.

BRIEF DESCRIPTION OF THE DRAWINGS

The object described above, other objects, features and advantages will become more apparent by the preferred exemplary embodiments described below and the following accompanying drawings.

FIG. 5 is a diagram illustrating a configuration of a last access time point table.

FIG. 7 is a block diagram illustrating a mobile device according to Exemplary Embodiment 4.

DESCRIPTION OF EMBODIMENTS

Figure 1:
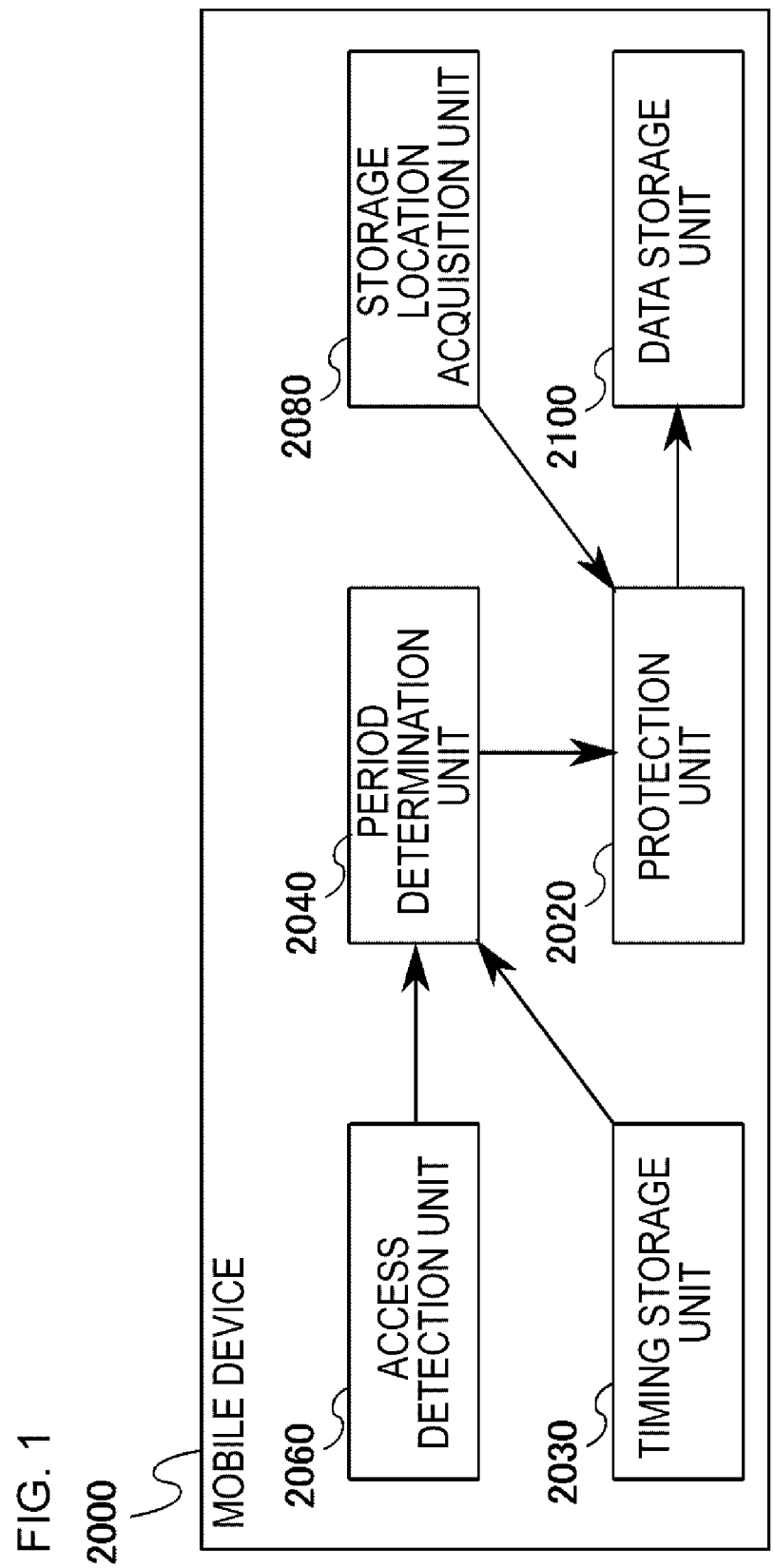
FIG. 1 is a block diagram illustrating a mobile device according to Exemplary Embodiment 1.

Hereinafter, exemplary embodiments of the present invention will be described with reference to drawings. In addition, in all drawings, the same components are denoted by the same reference numerals, and thus the description will not be further described, appropriately.

In addition, in the description given below, the components of each apparatus show blocks in functional units rather than the configuration in the hardware units. The components of each apparatus may be implemented by any combination of hardware and software, such as a CPU, a memory, a program for implementing the components illustrated in the drawings which are loaded in the memory, a storage media such as a hard disk that stores the program, and an interface for network connection, in any computers. There are many variations of the implementation method and the apparatus.

Exemplary Embodiment 1

Outline

FIG. 1 is a diagram illustrating a mobile device 2000 according to Exemplary Embodiment 1. When a pre-determined time period has elapsed after a user access is last detected, the mobile device 2000 determines that the mobile device 2000 is not under the control of an authorized user, and performs protection processing on the account-related information. The access by the user is an operation of some kind that the user performs on the mobile device 2000. For example, the access includes pressing of physical buttons such as a power button or keys in a key board, touching a screen, attaching or detaching of a device, opening and closing of the housing of the mobile device 2000, and the like.

The mobile device 2000 includes an access detection unit 2060, and a time period determination unit 2040. The access detection unit 2060 detects that the user accesses the mobile device 2000. The time period determination unit 2040 determines whether or not a pre-determined time period has elapsed from a point of time at which the user last accessed the mobile device 2000 (hereinafter, the last access time point).

The mobile device 2000 further includes a storage location acquisition unit 2080, a protection unit 2020, and a data storage unit 2100. The data storage unit 2100 stores various types of data as well as account-related information. The storage location acquisition unit 2080 acquires where the account-related information is stored in the data storage unit 2100. When the time period determination unit 2040 determines that a pre-determined time period has elapsed from the last access time point, the protection unit 2020 performs protection processing on the account-related information, based on the storage location of the account-related information which is acquired by the storage location acquisition unit 2080.

As described above, the time period determination unit 2040 determines whether a pre-determined time period has elapsed from the last access time point, and the protection unit 2020 protects the account-related information when the pre-determined time period has elapsed after the last access time point. Thus, it is possible to prevent the leakage of the account-related information.

Hereinafter, the details of the present exemplary embodiment will be described.

Configuration Details

A method by which the access detection unit 2060 detects that the user has accessed the mobile device 2000 is a known technology. For example, in general, an operating system (OS) has a function of detecting whether hardware under its own control is operated. The access detection unit 2060 detects the user access using such a kind of known technology.

There are various protection processings that the protection unit 2020 performs. For example, there are processing of removing account-related information, and a method of converting the account-related information into differently-expressed information by encryption and obfuscation. Further, there is a method of saving the account-related information in an external device when the mobile device 2000 is connected through a communication line to the external device capable of storing the account-related information. Note that, the communication line may be implemented in a wireless or wired manner, or by a combination of wireless and wired manners.

There are various methods of acquiring the storage location of the account-related information by the storage location acquisition unit 2080. For example, there is a method of providing an Application Programming Interface (API) used for storing the account-related information from an OS or a middleware with respect to each application. An API for storing data in an area which is defined in advance by the storage location acquisition unit 2080 may be an example of such APIs. In this case, the storage location acquisition unit 2080 acquires the above defined area as the storage location of the account-related information. In addition, an API for writing the storage location in a table which indicates the storage location of the account-related information and is managed by the storage location acquisition unit 2080 when an application stores the account-related information may be that. In this case, the storage location acquisition unit 2080 acquires the storage location of the account-related information by referring to the table.

The time period determination unit 2040 determines whether or not a pre-determined time period has elapsed from the last access time point by acquiring the latest access time point from the access detection unit 2060. Here, the access time point may be represented by any of or a combination of various types of information representing a date and time, a date, a time, and a day of the week of the access.

There are various methods for delivering the latest access time point between the time period determination unit 2040 and the access detection unit 2060. For example, there are a method in which the time period determination unit 2040 acquires the latest access time point by repeatedly inquiring of the access detection unit 2060, a method in which the access detection unit 2060 notifies the time period determination unit 2040 of the latest access time point, and a method in which a memory region that can be shared between the time period determination unit 2040 and the access detection unit 2060 is prepared and the latest access time point is delivered through the shared memory region. Specifically, for example, when access from the user is detected, the access detection unit 2060 writes the latest access time point into the shared memory region, and the time period determination unit 2040 acquires the latest access time point by repeatedly checking the contents in the shared memory region.

As a specific method in which the time period determination unit 2040 determines the elapse of a pre-determined time period, there is a method in which, for example, a difference between the latest access time point and the last access time point is calculated as an elapsed time, and it is determined that the pre-determined time period has elapsed when the elapsed time is longer than the pre-determined time period.

There are various methods of detecting by the protection unit 2020 that the time period determination unit 2040 has determined the elapse of the pre-determined time period. For example, there are a method in which the protection unit 2020 detects the determination by repeatedly inquiring of the time period determination unit 2040, and a method in which the protection unit 2020 detects the determination by receiving a notification from the time period determination unit 2040. In addition, there is also a method in which a memory that can be shared between the protection unit 2020 and the time period determination unit 2040 is prepared and the detection is performed using the shared memory region.

There are various methods of storing the last access time point. For example, there is a method of storing the last access time point in the time period determination unit 2040. In this case, the time period determination unit 2040 determines whether or not the pre-determined time period has elapsed from the last access time point to the latest access time point, and then stores the latest access time point as a new last access time point in the timing storage unit 2030. In addition, there is a method of storing the last access time point in the access detection unit 2060. In addition, the access detection unit 2060 may store the last access time point therein. In this case, the access detection unit 2060 may perform, for example, the delivery of the latest access time point described above and also the delivery of the last access time point.

There are various methods of setting a pre-determined time period which is a trigger to perform the protection of the account-related information. For example, there are a method in which the user inputs the pre-determined time period to the mobile device 2000, a method of transmitting the pre-determined time period which is input from another device to the mobile device 2000 through a communication line, and a method in which the mobile device 2000 acquires the pre-determined time period which is stored in an external server or the like from another device through a communication line.

Flow of Protection Processing of Account Information

Figure 2:
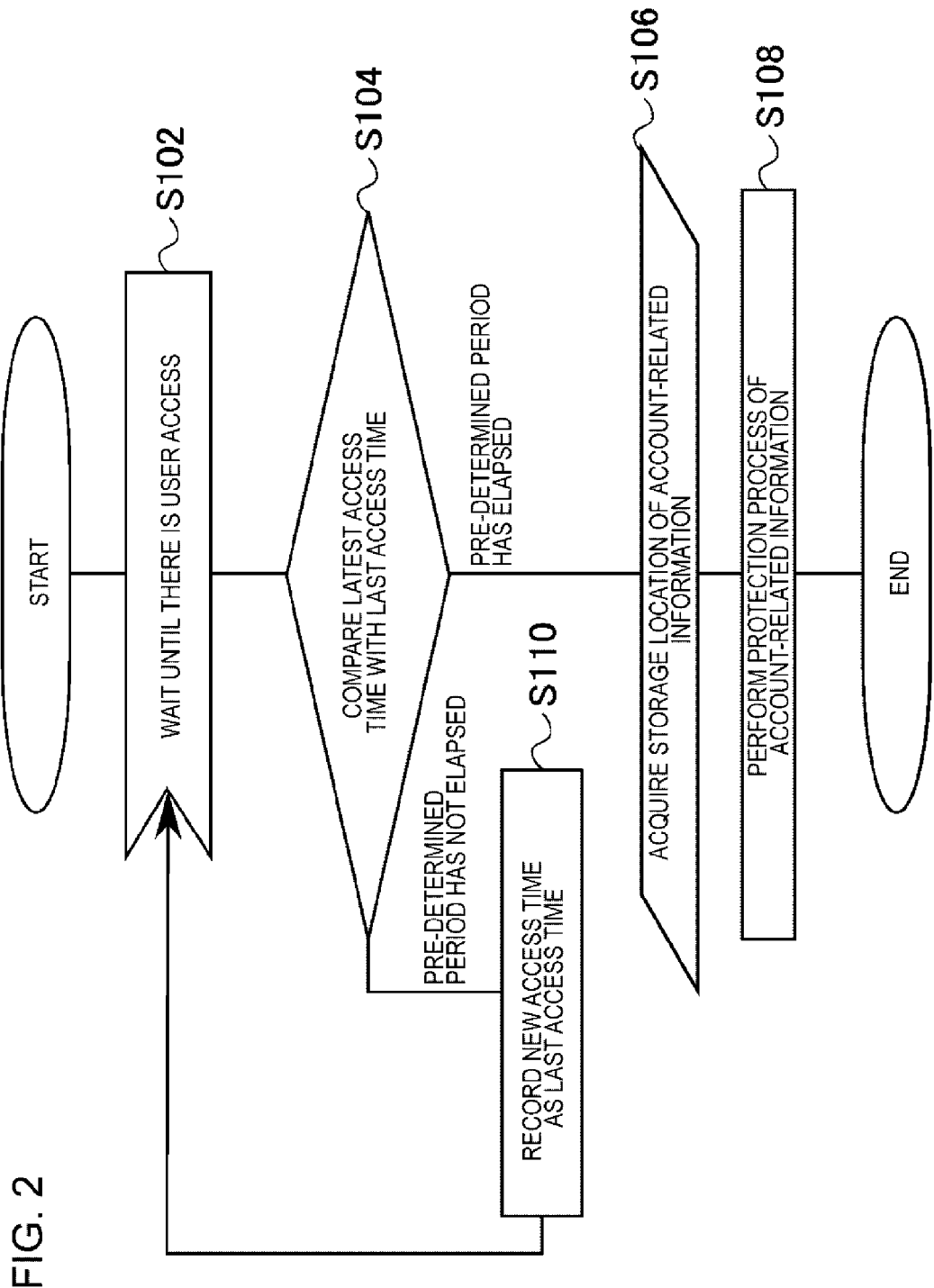
FIG. 2 is a flow chart illustrating a flow of protection processing of account-related information according to Exemplary Embodiment 1.

FIG. 2 is a flow chart illustrating a flow until the protection processing is performed on the account-related information after user access is detected.

First, in step S102, the process waits until the access detection unit 2060 detects the user access. Then, when the access detection unit 2060 detects the user access, the process proceeds to step S104.

In step S104, the time period determination unit 2040 compares the latest access time point detected by the access detection unit 2060 with the last access time point recorded in the timing storage unit 2030. As a result of comparison, when it is determined that a pre-determined time period has elapsed from the last access time point, the process proceeds to step S108 in order to perform the protection processing of the account-related information. When a pre-determined time period has not elapsed, the process proceeds to step S104.

In step S106, the protection unit 2020 acquires the storage location of the account-related information acquired by the storage location acquisition unit 2080. Then, in step S110, the protection unit 2020 performs the protection processing of the account-related information.

When the process proceeds from step S104 to step S110, the time period determination unit 2040 stores the latest access time point as a new last access time point in the timing storage unit 2030 in step S110. Then, the process proceeds to step S102 and waits until a new user access occurs.

As described above, the protection processing of the account-related information is performed when a pre-determined time period has elapsed from the last access time point, whereas the protection processing of the account-related information is not performed when the interval between the user accesses is within a pre-determined time period.

Operation and Effect

With the above configuration, according to the present exemplary embodiment, when the time period determination unit 2040 detects that a pre-determined time period has elapsed from the last access time point, the protection unit 2020 performs the protection processing of the account-related information, based on the storage location of the account-related information that the storage location acquisition unit 2080 acquires. Thus, when the mobile device 2000 is not accessed for a certain time period, the account-related information is collectively protected and thus it is possible to prevent the leakage of the account-related information.

Exemplary Embodiment 2

Outline

Figure 3:
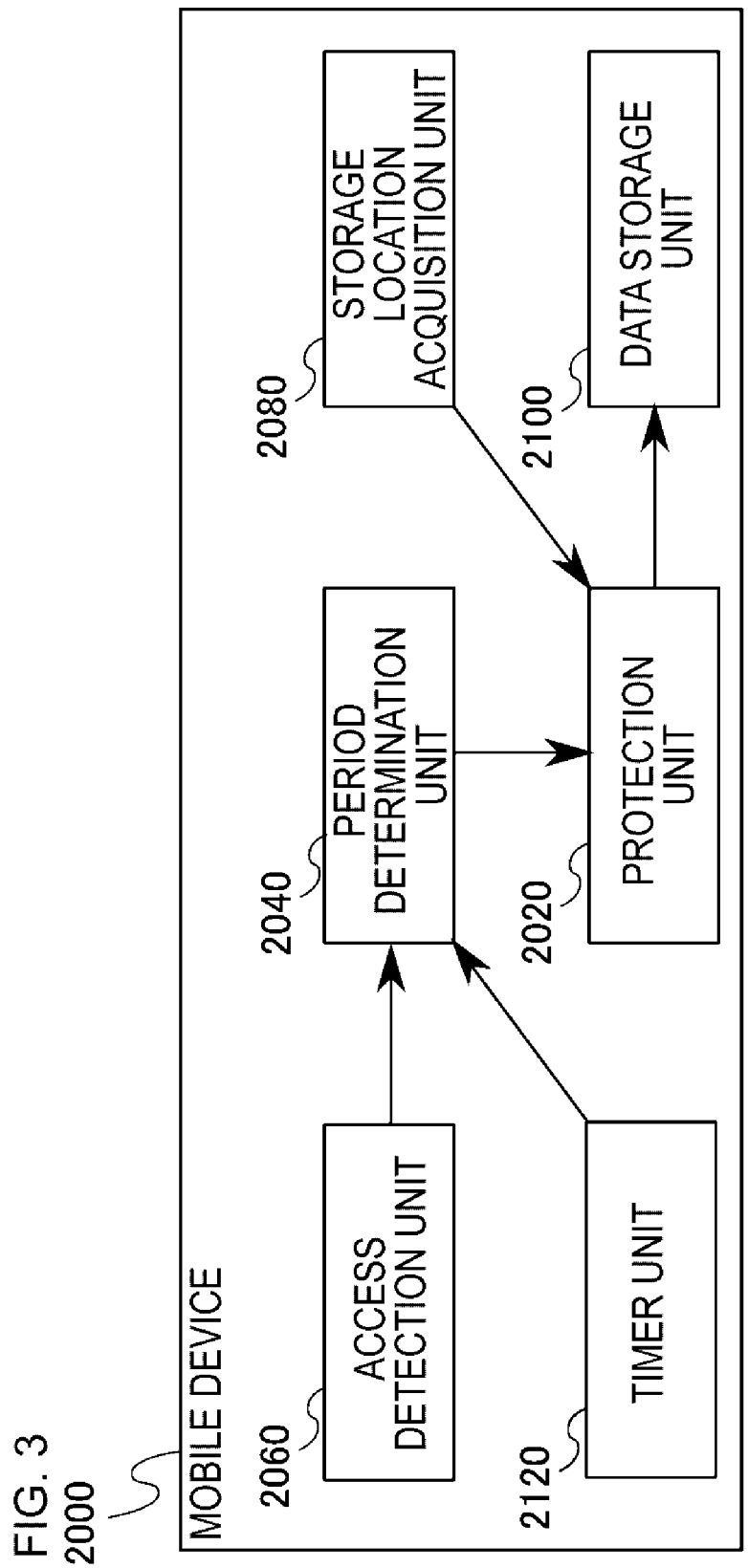
FIG. 3 is a block diagram illustrating a mobile device according to Exemplary Embodiment 2.

FIG. 3 is a block diagram illustrating the mobile device 2000 according to Exemplary Embodiment 2. Here, in FIG. 3, the functional blocks denoted by the same reference numerals as those in FIG. 1 have the same functions as those in FIG. 1 unless particularly described, and thus the description thereof will not be repeated.

The mobile device 2000 in Exemplary Embodiment 2 includes a timer unit 2120. The timer unit 2120 receives the time period setting, and detects that the set time period has elapsed. In Exemplary Embodiment 2, when the access detection unit 2060 detects the user access, the timer unit 2120 is set for a pre-determined time period described above. By doing so, the timer unit 2120 monitors the elapsed time from the last access time point, and detects that the pre-determined time period has elapsed. When there has been access by the user before a pre-determined time period has elapsed, the timer unit 2120 is re-set for the pre-determined time period, and thus the timer unit 2120 monitors the elapsed time from a new last access time point.

When the elapse of a pre-determined time period is detected by the timer unit 2120, the time period determination unit 2040 performs the protection processing of the account-related information.

As described above, the time period determination unit 2040 determines that a pre-determined time period has elapsed from the last access time point, and the protection unit 2020 protects the account-related information when the pre-determined time period has elapsed from the last access time point. Thus, it is possible to prevent leakage of the account-related information. In addition, by using the timer unit 2120, it is possible to immediately protect the account-related information when the elapse of the pre-determined time period is detected.

Hereinafter, the details regarding the present exemplary embodiment will be described.

Configuration Details

There are various methods of setting the timer unit 2120 for a pre-determined time period. For example, there are a method in which the access detection unit 2060 sets the pre-determined time period when the access detection unit 2060 detects the user access, and a method in which the time period determination unit 2040 sets the pre-determined time period when the time period determination unit 2040 ascertains that the user access is detected by the access detection unit 2060.

There are various methods of detection by the time period determination unit 2040 that the timer unit 2120 has detected the elapse of the pre-determined time period. For example, there are a method of detecting by receiving a notification from the timer unit 2120, and a method of detecting by that the time period determination unit 2040 repeatedly inquiries of the timer unit 2120. In addition, there may be a method in which some memory regions are shared between the time period determination unit 2040 and the timer unit 2120, the timer unit 2120 writes information indicating the elapse of the pre-determined time period into the shared memory when the pre-determined time period has elapsed, and the time period determination unit 2040 monitors the shared memory so as to detect the writing of the information.

Flow of Protection Processing of Account-Related Information

Figure 4:
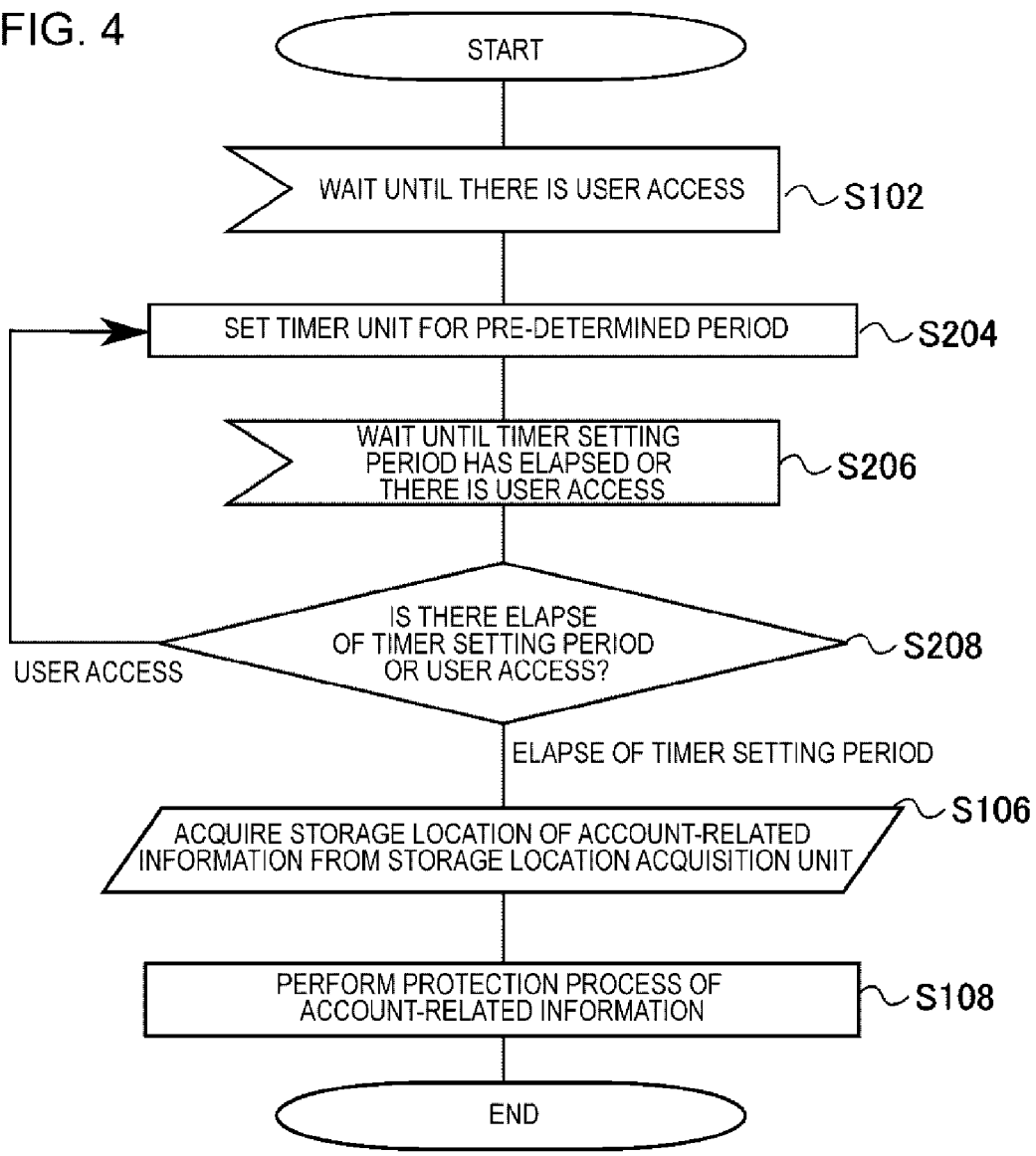
FIG. 4 is a flow chart illustrating a flow of protection processing of account-related information according to Exemplary Embodiment 2.

FIG. 4 is a flow chart illustrating a flow of processing of protecting the account-related information in Exemplary Embodiment 2. The processing of FIG. 4 starts from a state in which the setting of the time period has never been performed in the timer unit 2120.

First, in step S102, the process waits until the access detection unit 2060 detects a user access, and the process proceeds to step S204 after the access detection unit 2060 detects the user access. In step S204, the timer unit 2120 is set for the pre-determined time period. Then, in step S206, the process waits until the state becomes either 1) a new user access is detected or 2) the pre-determined time period set in the timer unit 2120 has elapsed. Then, when the state becomes either 1) or 2), the process proceeds to step S208.

In step S208, it is determined which one of 1) and 2) is established in step S206. When a state of 1) is established, the process proceeds to step S204. When a state of 2) is established, the process proceeds to step S106. Since the processing performed after step S106 is processing of protecting the account-related information and is the same as that indicated with the same reference numerals in FIG. 2, the description thereof will not be repeated.

When the process proceeds from step S208 to step S204, the setting of the pre-determined time period is performed again in the timer unit 2120. In this manner, when a new user access occurs before the pre-determined time period has elapsed set in the timer unit 2120, the elapsed time from the last access time point is monitored again by re-setting the setting time of the timer unit 2120, without performing the protection processing of the account-related information.

Through the above processing, the protection processing of the account-related information is performed when a pre-determined time period has elapsed from the last user access, whereas the protection processing of the account-related information is not performed while the intervals between the user accesses are within the pre-determined time period.

Operation and Effect

With the above configuration, according to the present exemplary embodiment, when the time period determination unit 2040 detects that the pre-determined time period has elapsed from the last access time point, the protection unit 2020 performs the protection processing on the account-related information, based on the storage location of the account-related information acquired by the storage location acquisition unit 2080. Thus, when the mobile device 2000 is not accessed by the user for a certain time period, the account-related information can be collectively protected. In addition, since the elapsed time from the last access time point is detected using the timer unit 2120, it is possible to immediately perform the protection processing of the account-related information when a pre-determined time period has elapsed.

Exemplary Embodiment 3

Outline

The configuration of a mobile device 2000 according to Exemplary Embodiment 3 is the same as that of FIG. 1 or FIG. 3.

When the mobile device 2000 has a plurality of accounts, the mobile device 2000 according to Exemplary Embodiment 3 detects the user access for each account, and performs the protection processing on the account-related information for each account. Specifically, when the access detection unit 2060 detects the user access, the access time point is stored with being associated with the account of the user who is currently logged in. Then, the time period determination unit 2040 determines whether or not a pre-determined time period has elapsed from the last access time point for each account. Then, when there is an account for which the pre-determined time period has elapsed from the last access time point, the protection processing is performed only on the account-related information associated with the account. By doing so, it is possible to perform the protection processing only on the account-related information of the account having a high risk of leakage.

Hereinafter, the details of the present exemplary embodiment will be described.

Storage of the Last Access Time Point for Each Account

In Exemplary Embodiment 3, the time period determination unit 2040 or the access detection unit 2060 stores the last access time point for each account. The timing storage unit 2030 stores the last access time point for each account, for example, in the last access time point table 100 shown in FIG. 5. The last access time point table 100 includes, for example, a user ID 102 for identifying an account, and the last access time point 104 which is the last access time point corresponding to the account.

Setting of Pre-Determined Time Period

In Exemplary Embodiment 3, a pre-determined time period which is a trigger for protection of the account-related information may be set for each account, or a common value may be used.

Flow of Protection Processing

Figure 6:
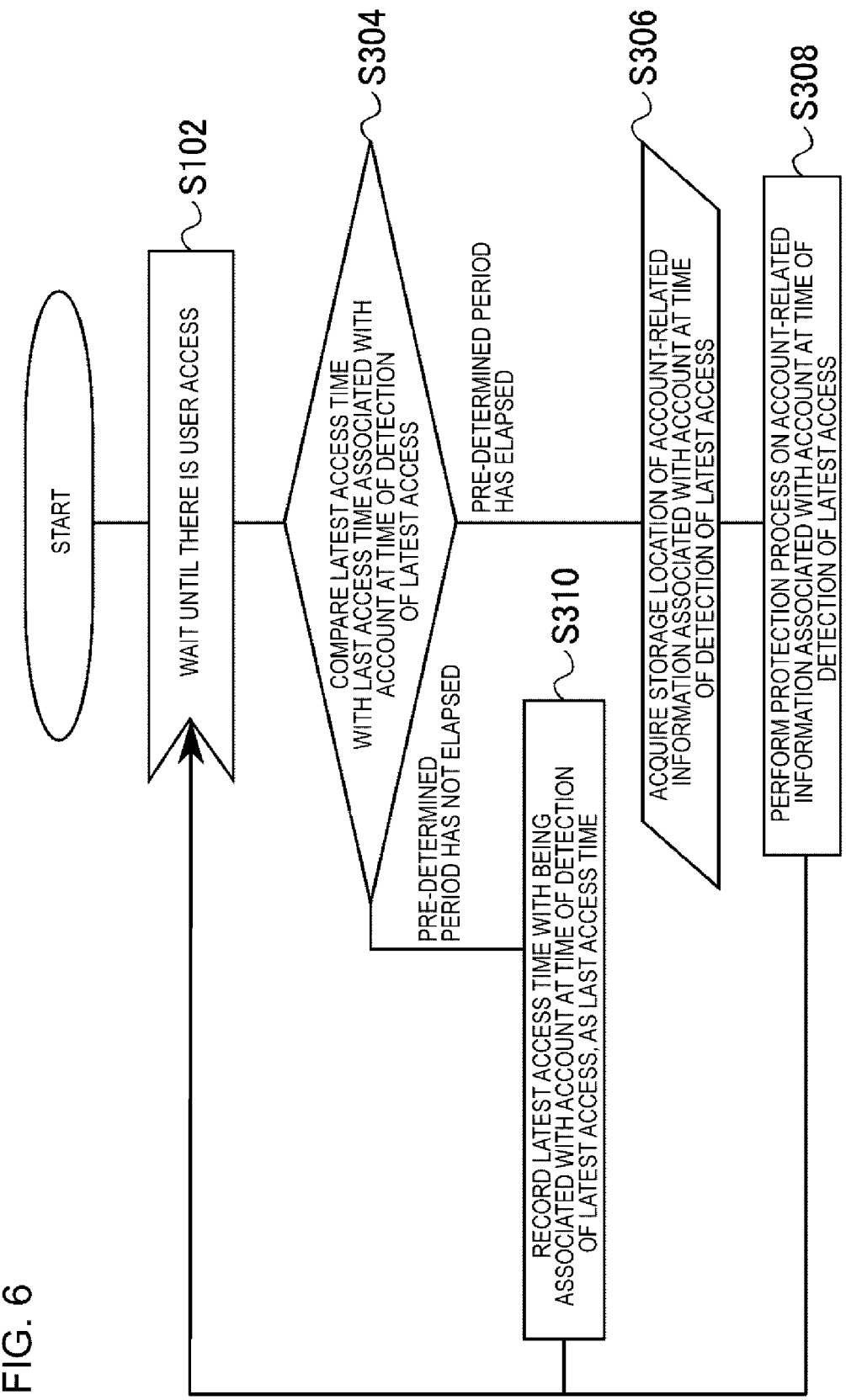
FIG. 6 is a flow chart illustrating a flow of protection processing of account-related information according to Exemplary Embodiment 3.

The details of the protection processing of the account-related information in the present exemplary embodiment will be described using the flow chart of FIG. 6. As described above, in the present exemplary embodiment, the protection of the account-related information is performed for each account.

First, in step S102, the process waits until the access detection unit 2060 detects a user access. If the access detection unit 2060 detects the user access, the process proceeds to step S304. Here, suppose that the mobile device 2000 is logged-in with the user ID of the account of alice (hereinafter, the account alice) when the access detection unit 2060 detects the user access in S102.

In step S304, the time period determination unit 2040 compares the latest access time point of the account alice detected by the access detection unit 2060 in step S102 with the last access time point of the account alice. For example, when the last access time point is stored in the last access time point table 100 shown in FIG. 5, a record of "user ID 102=alice" is in the first row, and thus the last access time point stored in the last access time point 104 of the record of the first row is referred to. Then, when a pre-determined time period has elapsed from the last access time point of the account alice, the process proceeds to step S306. On the other hand, when a pre-determined time period has not elapsed from the last access time point of the account alice, the process proceeds to step S310.

When the process proceeds from step S304 to step S306, in step S306, the protection unit 2020 acquires the storage location of the account-related information which is associated with the account alice from the storage location acquisition unit 2080. Then, in step S308, the protection unit 2020 performs the protection processing on the account-related information associated with the account alice. Then, the process returns to step S102 and waits until a new user access occurs.

When the process proceeds from step S304 to step S310, the latest access time point is stored as the last access time point of the account alice. For example, when the last access time point is stored in the last access time point table 100 shown in FIG. 5, the latest access time point is stored in the last access time point 104 of the record of the first row. Then, the process proceeds to step S304. In this manner, with respect to the account detected in step S102, it is determined whether a pre-determined time period has not elapsed from the last access time point, and when the pre-determined time period has not elapsed, the last access time point is updated, and then the process waits until a user access occurs again.

Through the processing of the above flow, it is determined whether a pre-determined time period has elapsed from the last access time point for each account, and the account-related information is protected for each account.

As an example in FIG. 5, a method of comparing the latest user access time point with the last access time point is used as a method of determining whether a pre-determined time period has elapsed from the last access time point. However, the method of determining whether a pre-determined time period has elapsed from the last access time point is not limited to the above method. For example, similarly to Exemplary Embodiment 2, the method of determination using the timer unit 2120 may be used.

Operation and Effect

With the above configuration, according to the present exemplary embodiment, when the time period determination unit 2040 detects that a pre-determined time period has elapsed from the last access time point, the protection unit 2020 performs the protection processing of the account-related information, based on the storage location of the account-related information that the storage location acquisition unit 2080 acquires. Thus, when the user does not access the mobile device 2000 for a certain time period, the account-related information can be collectively protected. In addition, the time period determination unit 2040 determines whether the pre-determined time period has elapsed from the last access time point for each account. When there is an account for which the pre-determined time period has elapsed from the last access time point, the protection unit 2020 protects the account-related information associated with the account. Thus, it is possible to perform the protection processing only on the account-related information of the account having a high risk of leakage.

Exemplary Embodiment 4

FIG. 7 is a diagram illustrating a mobile device 2000 according to Exemplary Embodiment 4. Here, in FIG. 7, the functional blocks denoted by the same reference numerals as those in FIG. 1 or FIG. 3 have the same functions as those in FIG. 1 or FIG. 3 unless particularly described, and thus the description thereof will not be repeated.

The mobile device 2000 includes an access restriction unit 2140 that restricts the data access by the user. The protection unit 2020 includes processing of restricting access to the account-related information, as the protection processing performed on the account-related information. Specifically, the protection unit 2020 protects the account-related information by instructing the access restriction unit 2140 to restrict accesses to the account-related information. For example, a setting of rejecting all accesses to the account-related information is performed. In addition thereto, there is a method of setting accessibility to the account-related information for each type of access such as writing, reading, and execution.

There are various methods of implementing access restriction by the access restriction unit 2140. For example, there is a method in which an OS or a middleware hooks a user access to data and checks which data is accessed, and the access is rejected when the account-related information is to be accessed. When the accessibility is set for each type of access, the type of access is also determined and the access is rejected or permitted according to each type of accesses. In addition, when the account-related information is stored as a file, there is a method of performing the access restriction by a method of changing the access authority of the file so as to inhibit access by all users. When the accessibility is set for each type of access, the access authority is set for each type of access. In addition, when the account-related information is stored in a memory, there is also a method of setting the memory region as an access-prohibited region. Also in this case, access authority is set for each type of access when the accessibility is set for each type of access.

With the above configuration, according to the present exemplary embodiment, when the time period determination unit 2040 detects that the pre-determined time period has elapsed from the last access time point, the protection unit 2020 performs the protection processing on the account-related information, based on the storage location of the account-related information that the storage location acquisition unit 2080 acquires. Thus, when the mobile device 2000 is not accessed by the user for a certain time period, the account-related information can be collectively protected. In addition, by protecting the account-related information with a method in which the access restriction unit 2140 restricts access to the account-related information, the protection of the account-related information can be performed in a fine-grained fashion so as to inhibit only writing, only reading and vice versa.

Exemplary Embodiment 5

A mobile device 2000 of Exemplary Embodiment 5 is represented, for example, by FIG. 1, FIG. 3 or FIG. 7.

The mobile device 2000 of Exemplary Embodiment 5 performs protection of account information, in addition to the account-related information. The details are as follows. First, the storage location acquisition unit 2080 stores the storage location of the account information, in addition to the account-related information. Then, when the time period determination unit 2040 determines that a pre-determined time period has elapsed from the last time point of a user access, the protection unit 2020 acquires the storage location of the account information and the account-related information from the storage location acquisition unit 2080, and performs the protection of the account-related information and the account information.

A method in which the storage location acquisition unit 2080 acquires the storage location of the account information is the same as a method in which the storage location acquisition unit 2080 acquires the storage location of the account-related information.

A method of delivering the storage location of the account information between the protection unit 2020 and the storage location acquisition unit 2080 is the same as a method of delivering the storage location of the account-related information between the storage location acquisition unit 2080 and the storage location acquisition unit 2080.

Operation and Effect

With the above configuration, according to the present exemplary embodiment, when the time period determination unit 2040 detects that the pre-determined time period has elapsed from the last access time point, the protection unit 2020 performs the protection processing on the account-related information, based on the storage location of the account-related information that the storage location acquisition unit 2080 acquires. Thus, when the mobile device 2000 is not accessed by the user for a certain time period, the account-related information can be collectively protected. In addition, more pieces of data associated with the account can be protected by protecting the account information as well as the account-related information.

Although exemplary embodiments of the present invention with reference to the drawings has described above, they are illustrative of the present invention, and the combinations of the above exemplary embodiments and the various configurations other than the above exemplary embodiments can be employed.

Note 1

A mobile device in which a plurality of applications are installed, the mobile device comprising:

a storage location acquisition unit which acquires a storage location of each piece of account-related information, the account-related information is used by each of the applications;

an access detection unit which detects a user access to the mobile device;

a time period determination unit which determines whether or not a pre-determined time period has elapsed after the access detection unit detects a last user access; and a protection unit which applies protection processing on each piece of the account-related information based on each storage location acquired by the storage location acquisition unit, when the time period determination unit determines that the pre-determined time period has elapsed.

Note 2

The mobile device according to Note 1, further comprising a timing storage unit which stores a time point of each user access which is detected by the access detection unit, wherein when the access detection unit detects a latest user access, the time period determination unit acquires from the timing storage unit a time point of a user access immediately previous to the latest user access as a time point of the last access, and compares the time point of the last access with a time point of the latest user access so as to determine whether or not a pre-determined time period has elapsed from the time point of the last access.

Note 3

The mobile device according to Note 1 or 2, further comprising a timer unit which monitors whether the pre-determined time period has elapsed after the access detection unit detects the last user access, wherein the time period determination unit determines that the pre-determined time period has elapsed, when the timer unit detects that the pre-determined time period has elapsed.

Note 4

The mobile device according to any one of Notes 1 to 3, wherein the access detection unit detects the user access for each account, wherein the time period determination unit determines whether or not the pre-determined time period has elapsed for each account, and wherein the protection unit performs the protection processing only on the account-related information associated with the account for which the time period determination unit determines that the pre-determined time period has elapsed.

Note 5

The mobile device according to any one of Notes 1 to 4, wherein as the protection processing, the protection unit performs at least one of: processing of deleting the account-related information; processing of converting the account-related information in accordance with a pre-determined rule; and processing of saving the account-related information to an external data storage device, the external data storage device is connected to the mobile device through a network.

Note 6

The mobile device according to any one of Notes 1 to 5, further comprising an access restriction unit which restricts access to the account-related information by the user, when an instruction is received from the protection unit, wherein as processing of protecting the account-related information, the protection unit performs processing of instructing the access restriction unit to restrict access to the account-related information.

Note 7

The mobile device according to any one of claims 1 to 6, wherein the storage location acquisition unit further acquires a storage location of account information, the account information is used by each application, and wherein the protection unit performs the protection processing on the account information based on the storage location of the account information that the storage location acquisition unit acquires, when the processing of protecting the account-related information is performed.

Note 8

A program for controlling a mobile device in which a plurality of applications are installed, the program causing the mobile device to have:

a function of acquiring a storage location of each piece of account-related information, the account-related information is used by each of the applications;

a function of detecting a user access to the mobile device;

a function of determining whether or not a pre-determined time period has elapsed after the function of detecting a user access detects a last user access; and a function of applying protection processing on each piece of the account-related information based on each storage location acquired by the function of acquiring a storage location of each piece of the account-related information, when the function of determining whether or not the pre-determined time period has elapsed determines that the pre-determined time period has elapsed.

Note 9

The program according to Note 8, further causing the mobile device to have a function of storing a time point of each user access which is detected by the function of detecting a user access, wherein when the function of detecting a user access detects a latest user access, the function of determining whether or not a pre-determined time period has elapsed reads out a time point of a user access immediately previous to the latest user access as a time point of the last access, among time points of the user access stored by the function of storing a time point of the user access, and compares the time point of the last access with a time point of the latest user access so as to determine whether or not a pre-determined time period has elapsed after the last user access is detected.

Note 10

The program according to Note 8, further causing the mobile device to have a function of monitoring whether the pre-determined time period has elapsed after the last user access is detected, wherein the function of determining whether the pre-determined time period has elapsed determines that the pre-determined time period has elapsed, when the function of monitoring the elapse of the pre-determined time period detects that the pre-determined time period has elapsed.

Note 11

The program according to any one of Notes 8 to 10,
wherein the function of detecting a user access detects the user access for each account,
wherein the function of determining whether the pre-determined time period has elapsed determines whether or not the pre-determined time period has elapsed for each account, and
wherein the function of applying protection processing on the account-related information performs protection processing only on the account-related information associated with the account for which the function of determining whether or not the pre-determined time period has elapsed determines that the pre-determined time period has elapsed.

Note 12

The program according to any one of Notes 8 to 11,
wherein as the protection processing, the function of applying protection processing on the account-related information performs at least one of: processing of deleting the account-related information; processing of converting the account-related information in accordance with a pre-determined rule; and processing of saving the account-related information to an external data storage device, the external data storage device is connected to the mobile device through a network.

Note 13

The program according to any one of Notes 8 to 12,
wherein as the processing of protecting the account-related information, the function of applying protection processing on account-related information includes a function of restricting access to the account-related information.

Note 14

The program according to any one of Notes 8 to 13,
wherein the function of the mobile device acquiring a storage location of each piece of account-related information further includes a function of acquiring a storage location of account information, the account information is used by each application, and
wherein the function of applying protection processing on the account-related information performs protection processing on the account information based on a storage location of the account information which is acquired by the function of acquiring a storage location of each piece of account-related information, when processing of protecting the account-related information is performed.

Note 15

A control method of controlling a mobile device in which a plurality of applications are installed, the method comprising:
a step of causing the mobile device to acquire a storage location of each piece of account-related information, the account-related information is used by each of the applications;
a step of causing the mobile device to detect a user access to the mobile device;
a step of causing the mobile device to determine whether or not a pre-determined time period has elapsed after the step of detecting a user access detects a last user access; and
a step of causing the mobile device to apply protection processing on each piece of the account-related information based on each storage location acquired in the step of acquiring a storage location of the account-related information, when the step of determining whether or not the pre-determined time period has elapsed detects that the pre-determined time period has elapsed.

Note 16

The control method according to Note 15, further comprising a step of causing the mobile device to store a time point of each user access which is detected in the step of detecting a user access,
wherein when the function of detecting a user access detects a latest user access, the step of determining whether or not a pre-determined time period has elapsed reads out a time point of a user access immediately previous to the latest user access as a time point of the last access, among time points of the user access which are stored by the function of storing a time point of the user access, and compares the time point of the last access with a time point of the latest user access so as to determine whether or not a pre-determined time period has elapsed after the last user access is detected.

Note 17

The control method according to Note 15, further comprising a step of causing the mobile device to monitor whether the pre-determined time period has elapsed after the last user access is detected,
wherein the step of determining the elapse of the pre-determined time period determines that the pre-determined time period has elapsed, when the step of monitoring whether the pre-determined time period has elapsed detects that the pre-determined time period has elapsed.

Note 18

The control method according to any one of Notes 15 to 17,
wherein the step of detecting the user access detects the user access for each account,
wherein the step of determining the elapse of the pre-determined time period determines whether or not the pre-determined time period has elapsed for each account, and
wherein the step of applying protection processing on the account-related information performs protection processing only on the account-related information associated with the account for which the step of determining whether or not the pre-determined time period has elapsed determines that the pre-determined time period has elapsed.

Note 19

The control method according to any one of Notes 15 to 18,
wherein as the protection processing, the step of applying protection processing on the account-related information performs at least one of: processing of deleting the account-related information; processing of converting the account-related information in accordance with a pre-determined rule; and processing of saving the account-related information to an external data storage device, the external data storage device is connected to the mobile device through a network.

Note 20

The control method according to any one of Notes 15 to 19,
wherein as the processing of protecting the account-related information, the step of applying protection processing on the account-related information includes a function of restricting access to the account-related information.

Note 21

The control method according to any one of Notes 15 to 20,
wherein the step of causing the mobile device to acquire a storage location of each piece of account-related information further includes a step of acquiring a storage location of account information, the account information is used by each application, and
wherein the step of applying protection processing on the account-related information performs the protection processing also on the account information based on a storage location of the account information which is acquired in the step of acquiring a storage location of each piece of account-related information, when the processing of protecting the account-related information is performed.

This application claims priority based on Japanese Patent Application No. 2012-136847 filed on Jun. 18, 2012, which is incorporated herein in its entirety by disclosure.

The invention claimed is:

1. A mobile device in which a plurality of applications are installed, the mobile device comprising:
a processor and an associated memory, the processor and memory including,
a storage location acquisition unit which acquires a storage location of each piece of account-related information, the account-related information is used by each of the applications;
an access detection unit which detects a user access to the mobile device;
a time period determination unit which determines whether a pre-determined time period has elapsed after the access detection unit detects a last user access;
a protection unit that protects each piece of the account-related information based on each storage location acquired by the storage location acquisition unit, when the time period determination unit determines that the pre-determined time period has elapsed; and
a timing storage unit which stores a time point of each user access which is detected by the access detection unit,
wherein when the access detection unit detects a latest user access, the time period determination unit acquires from the timing storage unit a time point of a user access immediately previous to the latest user access as a time point of the last access, and compares the time point of the last access with a time point of the latest user access so as to determine whether the pre-determined time period has elapsed from the time point of the last access.

2. The mobile device according to claim 1, further comprising a timer unit which monitors whether the pre-determined time period has elapsed after the access detection unit detects the last user access,
wherein the time period determination unit determines that the pre-determined time period has elapsed, when the timer unit detects that the pre-determined time period has elapsed.

3. The mobile device according to claim 1,
wherein the access detection unit detects the user access for each account,
wherein the time period determination unit determines whether the pre-determined time period has elapsed for each account, and
wherein the protection unit protects only the account-related information associated with the account for which the time period determination unit determines that the pre-determined time period has elapsed.

4. The mobile device according to claim 1,
wherein the protection unit performs at least one of: deleting the account-related information; converting the account-related information in accordance with a pre-determined rule; and saving the account-related information to an external data storage device, the external data storage is connected to the mobile device through a network.

5. The mobile device according to claim 1, further comprising an access restriction unit which restricts an access to the account-related information by the user, when an instruction is received from the protection unit,
wherein the protection unit instructs the access restriction unit to restrict the access to the account-related information.

6. The mobile device according to claim 1,
wherein the storage location acquisition unit further acquires a storage location of account information, the account information is used by each application, and
wherein the protection unit protects the account information based on the storage location of the account information which the storage location acquisition unit acquires, when the protecting of the account-related information is performed.

7. A non-transitory computer-readable storage medium comprising a program for controlling a mobile device in which a plurality of applications are installed, the program causing the mobile device to execute:
a function of acquiring a storage location of each piece of account-related information, the account-related information is used by each of the applications;
a function of detecting a user access to the mobile device;
a function of determining whether a pre-determined time period has elapsed after the function of detecting a user access detects a last user access;
a function of protecting each piece of account-related information based on each storage location acquired by the function of acquiring a storage location of each piece of account-related information, when the function of determining whether the pre-determined time period has elapsed determines that the pre-determined time period has elapsed; and
a function of storing a time point of each user access which is detected by the function of detecting the user access,
wherein when the function of detecting the user access detects a latest user access, the function of determining whether the time period has elapsed acquires the time point of a user access immediately previous to the latest user access as a time point of the last access, and compares the time point of the last access with a time point of the latest user access so as to determine whether the pre-determined time period has elapsed from the time point of the last access.

8. A control method of controlling a mobile device in which a plurality of applications are installed, the method comprising:
   a step of causing the mobile device to acquire a storage location of each piece of account-related information, the account-related information is used by each of the applications;
   a step of causing the mobile device to detect a user access to the mobile device;
   a step of causing the mobile device to determine whether a pre-determined time period has elapsed after the step of detecting a user access detects a last user access;
   a step of protecting each piece of the account-related information based on each storage location acquired in the step of acquiring a storage location of the account-related information, when the step of determining whether the pre-determined time period has elapsed detects that the pre-determined time period has elapsed; and
   a step of storing a time point of each user access which is detected by the step of detecting the user access,
   wherein when the step of detecting the user access detects a latest user access, the step of determining whether the time period has elapsed acquires the time point of a user access immediately previous to the latest user access as a time point of the last access, and compares the time point of the last access with a time point of the latest user access so as to determine whether the pre-determined time period has elapsed from the time point of the last access.

9. The mobile device according to claim 1, further comprising a timer unit which monitors whether the pre-determined time period has elapsed after the access detection unit detects the last user access,
   wherein the time period determination unit determines that the pre-determined time period has elapsed, when the timer unit detects that the pre-determined time period has elapsed.

10. The mobile device according to claim 1,
    wherein the access detection unit detects the user access for each account,
    wherein the time period determination unit determines whether the pre-determined time period has elapsed for each account, and
    wherein the protection unit protects only the account-related information associated with the account for which the time period determination unit determines that the pre-determined time period has elapsed.

11. The mobile device according to claim 2,
    wherein the access detection unit detects the user access for each account,
    wherein the time period determination unit determines whether the pre-determined time period has elapsed for each account, and
    wherein the protection unit protects only the account-related information associated with the account for which the time period determination unit determines that the pre-determined time period has elapsed.

12. The mobile device according to claim 1,
    wherein the protection unit performs at least one of: deleting the account-related information; converting the account-related information in accordance with a pre-determined rule; and saving the account-related information to an external data storage device, the external data storage is connected to the mobile device through a network.

13. The mobile device according to claim 2,
    wherein the protection unit performs at least one of: deleting the account-related information; converting the account-related information in accordance with a pre-determined rule; and saving the account-related information to an external data storage device, the external data storage is connected to the mobile device through a network.

14. The mobile device according to claim 3,
    wherein the protection unit performs at least one of: deleting the account-related information; converting the account-related information in accordance with a pre-determined rule; and saving the account-related information to an external data storage device, the external data storage is connected to the mobile device through a network.

15. The mobile device according to claim 1, further comprising an access restriction unit which restricts an access to the account-related information by the user, when an instruction is received from the protection unit,
    wherein the protection unit instructs the access restriction unit to restrict the access to the account-related information.

16. The mobile device according to claim 2, further comprising an access restriction unit which restricts an access to the account-related information by the user, when an instruction is received from the protection unit,
    wherein the protection unit instructs the access restriction unit to restrict the access to the account-related information.

17. The mobile device according to claim 3, further comprising an access restriction unit which restricts an access to the account-related information by the user, when an instruction is received from the protection unit,
    wherein the protection unit instructs the access restriction unit to restrict the access to the account-related information.

18. The mobile device according to claim 4, further comprising an access restriction unit which restricts an access to the account-related information by the user, when an instruction is received from the protection unit,
    wherein the protection unit instructs the access restriction unit to restrict the access to the account-related information.

19. The mobile device according to claim 1,
    wherein the storage location acquisition unit further acquires a storage location of account information, the account information is used by each application, and
    wherein the protection unit protects the account information based on the storage location of the account information which the storage location acquisition unit acquires, when the protecting the account-related information is performed.

* * * * *